United States Patent Office 2,889,312
Patented June 2, 1959

2,889,312

ALKYD RESINS MODIFIED WITH MONO-ALLYL MALEATE END GROUPS

Antoni Szayna, Passaic, N.J., assignor to United States Rubber Company, New York, N.Y., a corporation of New Jersey No Drawing. Application November 7, 1955
Serial No. 545,540

13 Claims. (Cl. 260—77)

This invention relates to improvements in the preparation of modified alkyd resins, and the resulting products.

An object of this invention is to provide an initially linear, fusible polyester in whose molecules selected glycol units [1] alternate with selected saturated and unsaturated dibasic acid units, and which are terminated at both ends of the molecule predominantly by groups of an allylic mono-ester of a butenedioic acid having from four to six carbon atoms.[2]

Such an improved modified alkyd predominantly contains molecular structures which typically may be illustrated as follows:

(1)

(2)

wherein ▷ is an allylic group, e.g., allyl or methallyl; ○ is a glycol unit; □ is a unit of a non-olefinic dicarboxylic acid such as succinic acid, adipic acid, sebacic acid or phthalic acid, etc.; and ▣ is a unit of an olefinic dicarboxylic acid such as maleic acid or fumaric acid.

It should be noted that the allylic group always is linked to an olefinic acid unit at both ends of the polyester, and that acid units alternate with glycol units. The two diagrams are symbolic and are not intended to limit the length or internal arrangement of the alkyd resins in other respects.

Such a modified alkyd has properties different from, and superior to, prior art alkyds made from like reagents. This difference arises from the fact that substantially all of the allylic groups in my product are connected by ester linkages to olefinic dibasic acid units and that at least some of the dibasic acid units in the chain of repeating acid and glycol units lack olefinic unsaturation. Prior alkyds containing allylic end groups have allylic groups attached both to olefinic dibasic acid units and to non-olefinic dibasic acid units, it being a matter of mere chance which type of acid unit is linked to any particular allylic group. I have now found that this difference in the type of dibasic acid units connected to the allylic groups greatly affects the properties of free-radical polymers made from the alkyd resin. For example, an alkyd (A) in which at least about 33 mol percent of the dibasic acid units are non-olefinic but wherein substantially all of the allylic groups are connected to olefinic dibasic acid units in accordance with my invention, gives polymers of higher tensile strength, better heat stability and higher torsional modulus than does a prior alkyd (B) made from the same components as alkyd (A) but in which a substantial portion, i.e., about 33% or more, of the allylic groups are connected to non-olefinic dibasic acid units.

Further, an alkyd (C) made from the same components as alkyds (A) and (B) but in which substantially all of the allylic groups are connected to non-olefinic dibasic acid units, gives polymers whose said properties are even poorer than those of the corresponding polymers of alkyd (B). This is shown below in Example 1. It is evident that the provision of solely olefinic dibasic acid units connected to the allylic groups has a large and unexpected effect on the properties of the resulting alkyd.

In essence, then, my invention consists in a method of making allylic-modified alkyds of mixed olefinic and non-olefinic dibasic acids, controlled in such a way that only olefinic dibasic acid units are linked to the allylic groups, and in the alkyds made by this method. So far as I know, such control has never been exercised heretofore, and thus such alkyds are new.

This new type of alkyd is made by esterifying two molar proportions of a mono-allylic ester of a butenedioic acid with one molar proportion of a polyester which is substantially entirely composed of a linear chain of units of a glycol alternating with organic dioic acid units of which at least a portion are of non-olefinic acids, said polyester, before esterification with the said allylic ester, having terminal alcoholic hydroxyl groups. The allylic ester and the alcohol-terminated polyester can be preformed in any desired way and then esterified with each other to form the new alkyd of this invention, or the new alkyd can be made directly from the several reagents provided that certain critical conditions are followed.

PROCESS I

A mono-allylic ester of a butenedioic acid and a substantially unmodified alkyd resin which is terminated substantially entirely by alcoholic hydroxyl groups and which contains at least some non-olefinic dibasic acid units, are heated together, preferably in the presence of an inhibitor of free-radical polymerization and an azeotropic carrier for the water formed in the esterification of the allylic ester by the resin. The reaction mixture is heated until substantially the expected amount of water has evolved, and the remaining carrier is removed by distillation or by bubbling an inert gas through the hot alkyd. The new allylic-modified resin of this invention is then ready for free-radical polymerization or any other desired use.

PROCESS II

A mono-allylic ester of a butenedioic acid is heated with at least one glycol and one or more dibasic acids, at least one of which acids must be non-olefinic, the reaction preferably being carried out in the presence of an inhibitor of free-radical polymerization and an azeotropic carrier. The amounts of the several reagents are so adjusted that the sum of the free carboxyl groups in the allylic ester and in the dibasic acids is substantially equal to the number of glycolic hydroxyl groups. The reaction is carried out by the same procedure as in Process I.

I prefer to use Process II for economic reasons.

For the same reason, I usually prepare the said allylic ester in the reaction vessel to be used for the subsequent preparation of my new alkyds, and I do not purify the allylic ester, especially when the chosen olefinic dibasic acid component thereof is one which has an anhydride. The formation of the ester from acid anhydride and allylic alcohol is rapid and easy. In fact, the reaction is so highly exothermic that it often is advisable to cool the mixture somewhat, or to add the alcohol gradually to the anhydride, or to dilute the mixture with any of those reagents for the subsequent preparation of the alkyd resin which are substantially inert toward the alcohol and the anhydride during formation of the mono-ester, in order to keep the desired reaction from getting out of hand. By one

---

[1] "Unit" refers to that repeating portion of an acid or a glycol which combines on mutual esterification to form a linear chain containing a plurality of such portions.
[2] The terms "unsaturated dibasic acid" and "olefinic dibasic acid" are used herein interchangeably in referring to butenedioic acids having four to six carbon atoms.

or more of these means, I hold the temperature of the reaction down to about 130–150° C. I also customarily carry out the reaction in the presence of an inhibitor of free-radical polymerization. The reaction is so rapid compared to the reaction between an allylic alcohol and a dibasic acid that the olefinic or non-olefinic acid which is to be used in a later step in making my alkyds can be present with the allylic alcohol and the olefinic acid anhydride, and will act only as an inert diluent during the formation of the mono-allylic butenedioate.

When the olefinic dioic acid with which the allylic alcohol is to be esterified is one which cannot form a cyclic anhydride (such as fumaric acid), the non-olefinic acid or anhydride component of the polyester must not be present until after the desired mono-allylic ester has been formed, in order to prevent reaction between the non-olefinic acid and the allylic alcohol. In any case, neither a non-olefinic anhydride nor a glycol can be present during esterification of the allylic alcohol.

The allylic alcohol is allyl alcohol or methallyl alcohol. Typical olefinic acids used in this invention are maleic acid, fumaric acid, citraconic acid, mesaconic acid, dimethylmaleic acid and alpha-ethylmaleic acid. A mixture of any of the acids can also be used to provide more than one kind of such mono-ester terminus.

Any non-olefinic dibasic acids which form conventional alkyd resins can be used in this invention. Typical ones are aliphatic acids such as oxalic acid, malonic acid, succinic acid, glutaric acids, adipic acid, azelaic acid, sebacic acid and diglycolic acid, and aromatic acids such as phatalic acid, isophthalic acid, terephthalic acid, and the naphthalenedicarboxylic acids. Mixtures of such acids may also be used.

The proportions of the reagents used in either process and the composition of the reagent alkyd used in Process I are critical in the following respects.

(1) The maximum amount of olefinic dibasic acid units in my new alkyds is about 67 mol percent of the total amount of dibasic acid units; the minimum amount is substantially the same, in mols, as the mols of allylic alcohol used.

(2) The amounts of the reagents may deviate from equivalency by up to 10% without markedly changing the properties of the products of this invention.

From limitation #1, it can be calculated that the minimum proportion of glycol units:allylic groups is 1.5:1. Theoretically, the amount of glycol can be increased over the minimum without limit, but in order to obtain a significant effect of the allylic ester end groups (▷ ▤), I prefer to use not over about ten glycol units per allylic group.

From limitation #1 it is also evident that the shortest alkyd chain which falls within my invention has the structure ▷ ▤ ○ □ ○ ▤ ◁. Thus it can be seen that the alkyd resins of this invention contain at least two glycol units and at least one internal dicarboxylic acid unit (i.e., acid units not connected to allylic groups). Obviously, the number of glycol units is always one more than the number of internal dicarboxylic acid units regardless of the length of the chain.

A volatile, azeotrope-forming carrier is usually used to hasten the removal of water formed during any step in the formation of the resins of this invention, and thus to accelerate the esterification and permit it to be driven substantially to completion. The carrier can be benzene, toluene, xylene, a naphtha of narrow boiling range, a suitable chlorinated hydrocarbon or other conventional, inert material. The amount of the carrier is quite small and is adjusted, by addition or by removal, so that the reaction is kept at any chosen temperature. Such adjustment, of course, is easy and is obvious to anyone skilled in making alkyd resins. The use of a carrier is conventional.

My new alkyd resins are made in the virtual absence of a conventional, strongly acidic catalyst of esterification such as sulfuric acid or p-toluenesulfonic acid, in order to obtain the benefits of the invention.

When the allylic group is methallyl it is occasionally inadvisable or even impossible to form the mono-methallyl butenedioate in the presence of the non-olefinic dibasic acid because methallyl alcohol isomerizes easily to isobutyraldehyde in the presence of some acids. Some of the dibasic acids used in this invention are strong enough to catalyze this isomerization. Simple experimentation shows quickly whether or not the mono-methallyl ester can be made in the presence of the non-olefinic acid, for isobutyraldehyde is a volatile material with a distinctive odor which can be recognized at once.

I usually prepare the new alkyl, and the monoallylic olefinic ester also, when it is made by Process II, under an inert gas such as nitrogen or carbon dioxide in order to obtain as light-colored a resin as possible and to prevent premature gelation. This is conventional practice in the industry.

The time and temperature of formation of the new alkyd resins are inter-related, but are not critical, and are not essential features of this invention. The reaction is carried out at any chosen temperature for such a time that the reaction has reached the desired degree of completion. The extent of reaction is observed conveniently by determining the acid number and the hydroxyl number, or, more easily, by measuring the amount of water liberated. Such determinations are conventional. I carry on the reaction until at least about 90% of the hydroxyl groups and carboxyl groups in the reaction mixture have mutually esterified each other.

Preferably, I carry out the reaction in the presence of a conventional inhibitor of free-radical polymerization in order to prevent premature homopolymerization of the product. Typical inhibitors are hydroquinone, quinone and para-tert-butylcatechol. However, the addition of such an inhibitor is not an essential part of this invention.

The following examples illustrate the invention. The term "mol" means "gram-molecular weight." The preparation of each resin was stopped when the total amount of water evolved was 90–100% of that calculated for complete esterification. Dry reagents were used so as to prevent hydrolysis of the anhydrides and so that the water formed during the second stage of esterification could be measured accurately. The use of dry reagents is not critical. The resins described in the examples are very viscous liquids which look like honey, and are soluble in organic liquids such as alcohols, ethers, ketones and aromatic hydrocarbons.

Examples 1–4 illustrate Process II.

*Example 1*

Three alkyd resins were prepared substantially in the same way except for the order in which the reagents were mixed. Resin A illustrates the invention. Resins B and C are shown for contrast, and do not illustrate the invention.

RESIN A

A mixture of 6.25 mols of allyl alcohol, 9.0 mols of maleic anhydride, 6.5 mols of adipic acid and 2 gms. of hydroquinone was charged into a flask equipped with a reflux condenser, stirrer and thermometer. Air was swept out of the system by a slow, continuous stream of nitrogen. Then the stirred mixture was heated to about 100° C. to start the formation of mono-allyl maleate. The evolved heat raised the temperature of the mixture to 130–150° C. Within 10 minutes at this temperature substantially all of the allyl alcohol had reacted with the maleic anhydride. (It had already been found that the adipic acid and the hydroquinone take no part in this first reaction other than to moderate it.) Then ethylene glycol (13.0 mols) and benzene (70 ml.)

were added, and a water trap filled with additional benzene was inserted below the condenser. The temperature of the mixture was gradually raised to 200° C. during 12 hours. Throughout this time water was formed, and was removed azeotropically. The temperature was conveniently adjusted by addition or removal of benzene. When esterification was nearly complete the gas inlet tube was pushed below the surface of the resin—in fact, almost to the bottom of the flask—and the water trap and reflux condenser were removed. The flow rate of the nitrogen then was considerably increased. The gas swept any volatile material out of the resin during about two hours of additional heating at 190-200° C. Finally, the resin was cooled to room temperature and stored until used. Its acid number, hydroxyl number and allyl content were determined.

RESIN B

A mixture of 13.0 mols of ethylene glycol, 6.5 mols of adipic acid, 9.0 mols of maleic anhydride, 2 gms. of hydroquinone and 70 ml. of benzene was heated under nitrogen for 4¾ hours at 125-200° C. to effect substantially complete esterification and removal of water. Then the mixture was cooled somewhat, allyl alcohol (6.25 mols) was added, and the temperature was raised gradually from 125° C. to 200 C. during the next 12 hours. The resin then was blown, cooled and analyzed.

RESIN C

A mixture of 13.0 mols of ethylene glycol, 9.0 mols of maleic anhydride and 40 ml. of benzene was heated at 135-205° C. for 7½ hours under nitrogen. Separately, a stirred mixture of 6.5 mols of adipic acid, 6.25 mols of allyl alcohol, 2 gms. of hydroquinone and 40 ml. of benzene was heated at 100-195° C. for 9 hours under nitrogen. Then the two mixtures were mixed together. Heating was continued for 11 hours more at 145-195° C. The water formed in the reactions was caught in a trap. The resin finally was blown, cooled and analyzed.

Resin A was made in such a way that substantially all of the allyl groups necessarily were attached to maleic acid residues, whereas Resin C was so made that substantially all of the allyl groups necessarily were attached to adipic acid residues. Both resins are new, but only Resin A illustrates this invention. As shown below, Resin C not only is much poorer than Resin A, but also is even poorer than Resin B, a conventional resin in which allyl groups were attached both to maleic acid residues and to adipic acid residues.

The analyses of these three resins, and the average molecular weights calculated from the analyses, follow:

| | A | B | C |
|---|---|---|---|
| Acid number | 6.1 | 4.9 | 29.4 |
| Hydroxyl number | 24.7 | 32.3 | 17.1 |
| Weight percentage of allyl groups (as the alcohol) | 14.5 | 14.7 | 15.4 |
| Calculated molecular weight of resin | 644 | 625 | 574 |

These figures show that the three resins are substantially alike in allylic chain endings. The molecular weights are alike within the limits of precision of the preparations and of the analyses.

Each of the three resins (84 gms.) was copolymerized with methyl methacrylate (16 gms.) in the presence of Luperco ATC [3] (3 gms.) in molds for 16 hours at 55° C., followed by one hour at 110° C. The insoluble, infusible copolymers were then tested conventionally, as shown below. All tests were carried out at room temperature except as noted.

[3] A mixture of equal parts by weight of benzoyl peroxide and tricresyl phosphate.

| | Copolymer of resin | | |
|---|---|---|---|
| | A | B | C |
| Tensile strength (p.s.i.) | 4,610 | 3,390 | 2,770 |
| Elongation (percent) | 12 | 10 | 8 |
| Elastic modulus at 25° C. (p.s.i.) | 634,000 | 174,000 | 206,000 |
| Elastic modulus at 100° C. (p.s.i.) | 48,800 | 23,200 | 18,850 |
| Impact strength, notched Izod | .28 | .30 | .29 |
| Rockwell hardness, R scale | 117 | 118 | 104 |

These tests show that certain properties, e.g., hardness and impact strength, of the copolymers of the three resins are independent of the location of the maleic acid residues along the alkyd chains, and that other properties such as the tensile strength, elastic modulus and softening point (as shown by the modulus at different temperatures) are very greatly affected by the location of the maleic acid residues. Resin A, which illustrates this invention and contains a maximum number of penultimate (i.e., connected to allyl groups) maleic residues, is considerably better than Resin B which illustrates the random preparation of the prior art. Resin B in turn is somewhat better than Resin C, which was deliberately made with substantially no maleic acid residues at the chain ends.

In similar manner, insoluble, infusible copolymers of styrene with each of Resins A, B, and C were made and tested. Each monomer mixture was heated for one hour at 70° C. followed by one hour at 110° C. at styrene/alkyd ratios of 20/80 and 50/50 (by weight). Each resin also was heated with Luperco ATC alone under the same conditions used for making the styrene copolymers. Tests on the three groups of polymers confirmed the conclusion that Resin A is better than Resin B, which in turn is better than Resin C, despite the fact that all three resins are substantially alike in empirical composition, but differ significantly in the location of the maleic acid residues.

The resins described in Example 1 were made from an amount of maleic anhydride in excess of that required to convert all of the allyl alcohol to monoallyl maleate. Thus, every resin, regardless of the sequence of charging the reagents, necessarily contained at least some maleic acid residues in internal positions along the chain (i.e., connected only to glycol residues).

*Example 2*

Equimolar amounts of allyl alcohol and maleic anhydride were used in making the two following resins, so that Resin D—illustrating this invention—necessarily contains substantially no maleic acid residues in internal positions.

Reaction conditions not specified below were like those in Example 1.

RESIN D

A mixture of 2 mols of allyl alcohol, 2 mols of maleic anhydride and 1 gm. of hydroquinone was heated for 15 minutes at 145° C. to form two mols of mono-allyl maleate. Then a mixture of 5 mols of succinic anhydride, 6 mols of ethylene glycol and 50 ml. of benzene was added to the first mixture. The combined mixture was heated for 12½ hours at 134-206° C.

RESIN E

A mixture of 2 mols of maleic anhydride, 6 mols of ethylene glycol and 50 ml. of benzene was heated for 5 hours at 125-202° C. in order to esterify the maleic anhydride completely. Separately, a mixture of 2 mols of allyl alcohol, 5 mols of succinic anhydride and 1 gm. of hydroquinone was heated for 10 minutes at 150° C. to convert substantially all of the allyl alcohol into monoallyl succinate. Then the two ester mixtures were combined and heated for 15 hours at 152-190° C.

Both resins were blown, analyzed, and polymerized— both alone and with methyl methacrylate—as in Example 1.

Analyses of the resins:

|  | D | E |
|---|---|---|
| Acid number | 13 | 35 |
| Hydroxyl number | 21 | 0 |
| Weight percentage of allyl groups (as alcohol) | 11.3 | 13.5 |
| Calculated molecular weight of resin | 784 | 679 |

Properties of the polymers:

| (1) Homopolymers of | Resin D | Resin E |
|---|---|---|
| Tensile strength (p.s.i.) | 2,460 | 820 |
| Elongation (percent) | 22 | 39 |
| Rockwell hardness, R scale | 60 | 54 |
| Elastic modulus at 25° C. (p.s.i.) | 30,000 | 5,610 |
| Elastic modulus at 100° C. (p.s.i.) | 6,500 | 4,700 |

| (2) Copolymers of methyl methacrylate and | Resin D | Resin E |
|---|---|---|
| Tensile strength (p.s.i.) | 4,840 | 1,690 |
| Elongation (percent) | 18 | 39 |
| Rockwell hardness, R scale | 92 | 32 |
| Elastic modulus at 25° C. (p.s.i.) | 156,000 | 10,450 |
| Elastic modulus at 100° C. (p.s.i.) | (1) | 3,880 |

1 Not tested.

This example, like Example 1, shows the critical importance of the order of mixing the reagents. Resin D necessarily contains substantially no maleic residues in internal positions in the chain, all of them being joined to the allyl end groups, whereas Resin E necessarily contains maleic residues substantially at internal positions only, the allyl groups being joined only to succinic residues. The polymers made from Resin D, which illustrates the invention, are much better than those made from Resin E, which represents an undesirable order of mixing the reagents.

*Example 3*

A mixture of 4 mols of mono-allyl maleate, 8 mols of phthalic anhydride, 10 mols of ethylene glycol, 1 gm. of para-tert-butylcatechol and 60 ml. of benzene was heated for 16 hours while the temperature was being raised gradually from 148° C. to 204° C., the other conditions being as in Example 1. The resin, which illustrates the invention, then was blown, analyzed and polymerized.

Analysis of resin:

Acid number ------------------------------- 17.4
Hydroxyl number --------------------------- 15.5
Weight percentage of allyl groups (as alcohol) ---- 10.8
Calcd. molecular weight -------------------- 757

Properties of the polymers: a

| Polymer | 1 | 2 | 3 | 4 | 5 |
|---|---|---|---|---|---|
| Tensile strength (p.s.i.) | 5,000 | 5,850 | 5,700 | 3,400 | 6,000 |
| Elongation (percent) | 11 | 16 | 10 | 6 | 16 |
| Elastic modulus at 25° C. (p.s.i.) | 458,000 | 197,000 | 356,000 | 403,000 | 624,000 |
| Elastic modulus at 100° C. (p.s.i.) | 7,000 | 2,150 | 700 | 8,150 | 1,950 |
| Impact strength (notched Izod) | .14 | .20 | .18 | .24 | .21 |
| Rockwell hardness, R scale | 123 | 98 | 120 | 118 | 118 | a Polymer #1 is a homopolymer; #2–5 are copolymers of (100−x)% resin and x% comonomer; #2 had 16% styrene in feed; #3 had 50% styrene in feed; #4 had 40% diallyl phthalate in feed; and #5 had 16% methyl methacrylate in feed. Polymers #1 and #5 were made in the same way as the corresponding ones in Example 1; polymers 2–4 were made in the same way as the styrene copolymers in Example 1.

Example 3 shows that the non-olefinic acid can be phthalic, and that the mono-allylic ester of the olefinic acid can be made externally.

*Example 4*

A mixture of 9.0 mols of maleic anhydride, 7.0 mols of allyl alcohol, 6.5 mols of diglycolic acid and 6 gms. of para-tert-butylcatechol was heated for 20 minutes at 130–147° C. to convert substantially all of the allyl alcohol to monoallyl maleate. As usual, most of the heat was supplied by the exothermic reaction itself. Under these conditions substantially none of the diglycolic acid reacted. Diethylene glycol (12.0 mols) and benzene (70 ml.) were added. Then the mixture was heated for 21 hours while the temperature was raised gradually from 128° C. to 201° C. The resin, which illustrates the invention, then was blown, analyzed and polymerized.

Analysis of resin:

Acid number ------------------------------- 12.5
Hydroxyl number --------------------------- 25.5
Weight percentage of allyl groups (as alcohol) ---- 12.2
Calcd. average molecular weight ----------- 717

Properties of the polymers: a

| Polymer | 1 | 2 | 3 | 4 |
|---|---|---|---|---|
| Tensile strength (p.s.i.) | 1,860 | 5,540 | 850 | 5,150 |
| Elongation (percent) | 18 | 26 | 19 | 19 |
| Elastic modulus at 25° C. (p.s.i.) | 13,000 | 129,000 | 17,000 | 44,200 |
| Elastic modulus at 100° C. (p.s.i.) | 5,500 | 1,730 | 3,900 | 4,850 |
| Impact strength (notched Izod) | .72 | .52 | .28 | .37 |
| Rockwell hardness, R scale | 57 | 92 | 51 | (1) |

1 Not tested.
a Polymer #1 is a homopolymer; #2–4 are copolymers of (100−x)% resin and x% comonomer; #2 had 50% styrene in feed; #3 had 40% diallyl phthalate in feed; #4 had 16% methyl methacrylate in feed. Each polymer was made in the same way as the corresponding one in Example 3. Percentages are by weight.

The following examples illustrate Process I of my invention.

*Example 5*

A mixture of 12.6 mols of adipic acid, 12.6 mols of maleic anhydride, 30 mols of ethylene glycol, 2 gms. of p-tert-butylcatechol and 130 ml. of benzene was heated and stirred under nitrogen for 18 hours at 119–198° C. During this, 675 ml. of water came off (theory 680 ml.). Nitrogen then was blown through the resin for 2 hours at 195–200° C. This resin had an acid number of 2.4, a hydroxyl number of 103, and a calculated average molecular weight of 1065.

Separately, a mixture of 4.1 mols of maleic anhydride, 4.1 mols of allyl alcohol and 2.25 gms. of p-tert-butylcatechol was heated for 15 minutes at 145–155° C. to form 4.1 mols of mono-allyl maleate.

To this maleate was added 2,178 gms. (2.04 mols) of the above resin. The mixture was heated and stirred under nitrogen for 14 hours at 143–200° C.; i.e., until the calculated amount of water had evolved. This alkyd resin, which illustrates this invention, had an acid number of 5.0, a hydroxyl number of 16.7, a weight percentage of allyl groups (as alcohol) of 9.08, and a calculated average molecular weight of 1247.

Six polymers were made from this resin. The compositions, polymerizing conditions and physical properties of the polymers are as follows:

| Polymer | 1 | 2 | 3 | 4 | 5 | 6 |
|---|---|---|---|---|---|---|
| Resin of Example 5 | 100 | 84 | 50 | 84 | 60 | 84 |
| Styrene | | 16 | 50 | | | |
| Diallyl phthalate | | | | 16 | 40 | |
| Methyl methacrylate | | | | | | 16 |
| Luperco ATO | 3 | 3 | 3 | 3 | 3 | 3 |

Each mixture was heated successively for one hour at 50° C., one hour at 70° C. and two hours at 130° C.

| Properties | 1 | 2 | 3 | 4 | 5 | 6 |
|---|---|---|---|---|---|---|
| Tensile strength (p.s.i.) | 3,740 | 2,930 | 4,740 | (1) | 1,760 | 3,850 |
| Rockwell hardness, R scale | 97 | 116 | 120 | 112 | 118 | 114 |
| Elastic modulus at 25° C. (p.s.i.) | 115,000 | 270,000 | 273,000 | 278,000 | 364,000 | 268,000 |
| Elastic modulus at 100° C. (p.s.i.) | 15,400 | 53,900 | 23,800 | 6,070 | 104,000 | 36,700 |
| Impact strength (notched Izod) | 0.48 | 0.43 | 0.52 | 0.35 | 0.26 | 0.47 |

[1] Not tested.

*Example 6*

A mixture of 2.0 mols of adipic acid, 2.0 mols of phthalic anhydride, 3.0 mols of ethylene glycol, 2.0 mols of diethylene glycol and 30 ml. of benzene was heated and stirred under carbon dioxide in the apparatus described in Example 1 for 4.5 hours at 160–201° C. During this time 106.5 ml. of water came off (theory 108 ml.). Carbon dioxide then was blown through the resin for 2 hours at 190–198° C. This resin had an acid number of 2.2.

A mixture of 2.2 mols of mono-allyl maleate (techn. ester assaying 93%), 0.8 g. of p-tert-butylcatechol and 50 ml. of benzene was added to the resin in the same reaction vessel. The resulting mixture was heated and stirred under carbon dioxide for 7 hours at 176–218° C. During this time 36 ml. of water was taken off. The resin finally was blown with carbon dioxide for 2 hours at 190–204° C., cooled and stored until used. It had an acid number of 16 and a theoretical average molecular weight of 1146.

This resin, which illustrates my invention, is comparable to Resin D of Example 2 in that substantially all of the allyl groups and maleic acid residues necessarily are joined to each other at the ends of the alkyd chains, with no olefinic unsaturation elsewhere in the chains, although of course the internal compositions of the two resins are different.

Three polymers were made from this resin. The compositions, polymerizing conditions, and physical properties of the polymers are as follows:

| Polymer | 1 | 2 | 3 |
|---|---|---|---|
| Resin of Example 6 | 100 | 84 | 60 |
| Diallyl phthalate | | 16 | |
| Styrene | | | 40 |
| Luperco ATC | 3 | 3 | 3 |

Each mixture was heated successively for one hour at 50° C., one hour at 70° C., and 2 hours at 130° C.

| Properties | 1 | 2 | 3 |
|---|---|---|---|
| Shore hardness | 93 | 99 | 95 |
| Rockwell hardness, R scale | 44 | 64 | (1) |
| Tensile strength (p.s.i.) | (2) | 1,620 | 1,030 |
| Elastic modulus at 25° C. (p.s.i.) | 4,050 | 21,800 | 9,860 |
| Impact strength (notched Izod) | 1.8 | 0.9 | 3.6 |

[1] Too soft.
[2] Not tested.

*Example 7*

A mixture of 1.0 mol of adipic acid, 1.0 mol of phthalic anhydride, 1.0 mol of maleic anhydride, 2.0 mols of ethylene glycol, 2.0 mols of diethylene glycol, 0.2 gm. of p-tert-butylcatechol and 30 ml. of benzene was heated as shown in Example 6. This resin had an acid number of 6.6 and a calculated molecular weight of 650.

A mixture of 2.2 mols of mono-allyl maleate (366 gms. of 93% techn.), 0.3 gm. of p-tert-butylcatechol and 25 ml. of benzene was added to the resin and the second stage of the reaction was carried out as shown in Example 6.

The final resin, which illustrates this invention, had an acid number of 34. Necessarily, substantially all of the allyl groups are joined to maleic acid units, but other maleic acid units are scattered along the alkyl chains. In this respect this resin is similar to the resin of Example 5.

This resin was polymerized as shown in Example 6 to give the following copolymers:

| Polymer | 1 | 2 | 3 |
|---|---|---|---|
| Resin of Example 7 | 100 | 84 | 60 |
| Diallyl phthalate | | 16 | |
| Styrene | | | 40 |
| Luperco ATC | 3 | 3 | 3 |
| Properties of polymer: | | | |
| Barcol hardness | 30 | 16 | 8 |
| Rockwell hardness, M scale | 73 | 73 | 68 |
| Tensile strength (p.s.i.) | (1) | 3,280 | 6,020 |
| Elastic modulus at 25° C. (p.s.i.) | 171,000 | 171,500 | 156,000 |
| Impact strength (notched Izod) | 0.4 | 0.3 | 0.8 |

[1] Not tested.

Examples 5 to 7 show that useful resins can be made by Process I of this invention.

In the same way mono-allyl fumarate is reacted with alkyd resins which have terminal alcoholic hydroxyl groups and which have enough non-olefinic dibasic acid residues so that at least 33 mol percent of the dibasic acid units of the reaction product are non-olefinic.

Other mono-allylic esters which can be used in my invention are mono-methallyl maleate, mono-methallyl fumarate, mono-allyl citraconate, mono-allyl mesaconate and mono-methallyl citraconate.

The new resins of this invention, and the polymers thereof, are useful in the same fields in which prior alkyd resins and polymers are useful; namely, in protective coatings and films; molded goods such as buttons; potting resins; and in various laminates, e.g., glass laminates for car bodies and boat hulls, or laminates with cloth, paper and asbestos.

It is to be understood that when a dicarboxylic acid reagent is mentioned in the appended claims I intend the term "acid" to include both the free acid and its cyclic anhydride if the anhydride exists.

Having thus described my invention, what I claim and desire to protect by Letters Patent is:

1. A method of making a modified linear polyester resin which comprises esterifying, in the substantial absence of a strongly acidic catalyst of esterification, substantially two molecular weights of a mono-allylic ester of a butenedioic acid having from four to six carbon atoms and containing only carbon, hydrogen, and the carboxylic oxygen atoms with one molecular weight of a polyester which is substantially entirely composed of linear chains of units of a glycol alternating with organic dicarboxylic acid units, wherein enough of the acid units in the reagent polyester are non-olefinic so that at least 33 mol percent of the dibasic acid units in the said modified polyester resin are non-olefinic, wherein the reagent polyester chains terminate substantially only with alcoholic hydroxyl groups, until at least about 90% of the hydroxyl groups and carboxyl groups in the reaction mixture have mutually esterified each other, the formed modified linear polyester resin having at each end of its linear chain a mono-allylic ester group linked to one of the butenedioic acid radicals.

2. The method of claim 1, wherein the mono-allylic ester is mono-allyl maleate.

3. The method of claim 1, wherein the mono-allylic ester is mono-allyl fumarate.

4. The method of claim 1, wherein the mono-allylic ester is mono-methallyl maleate.

5. A modified linear chain alkyd resin made by the process of claim 2, said chain being esterified at each end with a mono-allylic ester of a butenedioic acid having from four to six carbon atoms and containing only carbon, hydrogen and the carboxylic oxygen atoms.

6. An alkyd resin as described in claim 5, wherein the ester is mono-allyl maleate.

7. An alkyd resin as described in claim 5, wherein the ester is mono-allyl fumarate.

8. An alkyd resin as described in claim 5, wherein the ester is mono-methallyl maleate.

9. A method of making a modified linear polyester resin which comprises esterifying, in the substantial absence of a strongly acidic catalyst of esterification, two molecular weights of a mono-allylic ester of a butenedioic acid having from four to six carbon atoms and containing only carbon, hydrogen and the carboxylic oxygen atoms with a mixture of at least two molecular weights of at least one glycol and at least one molecular weight of at least one dicarboxylic acid, wherein the amount of glycol is greater than the amount of dibasic acid by about one molecular weight and wherein enough dibasic acid is non-olefinic so that at least 33 mol percent of the dibasic acid units in the said modified polyester resin are non-olefinic, until substantially all of the allylic ester, glycol and dibasic acid are mutually esterified and wherein the formed modified linear polyester resin has at each end of its linear chain a mono-allylic ester group linked to one of the butenedioic acid radicals.

10. The method of claim 9 wherein the mono-allylic ester is mono-allyl maleate.

11. The method of claim 10 wherein the alcohol is allyl alcohol and the anhydride is maleic anhydride.

12. The method of claim 9 wherein the mono-allylic ester is made by substantially completely esterifying an allylic alcohol with an anhydride of a cis-butenedioic acid having from four to six carbon atoms and containing only carbon, hydrogen and the carboxylic oxygen atoms with formation of mono-allylic ester of said acid at a temperature in the range from about 130° C. to about 150° C., in the presence of reagents selected from the group consisting of at least one free dicarboxylic acid and any excess of the said anhydride, and wherein said anhydride is the only anhydride present during the esterification of the allylic alcohol, and thereafter anhydride of non-olefinic dicarboxylic acid and glycol and dibasic acid reagents named in claim 9 are mixed with the mono-allylic ester.

13. A method of making a modified linear polyester resin which comprises esterifying, in the substantial absence of a strongly acidic catalyst of esterification, substantially two molecular weights of a mono-allylic ester of a butenedioic acid having from four to six carbon atoms and containing only carbon, hydrogen and the carboxylic oxygen atoms with a reagent selected from the group consisting of (A) one molecular weight of a preformed polyester which is substantially entirely composed of linear chains of units of a glycol alternating with organic dicarboxylic acid units, wherein enough of the acid units in the reagent polyester are non-olefinic so that at least 33 mol percent of the dibasic acid units in the said modified polyester are non-olefinic, and wherein the reagent polyester chains terminate substantially only with the alcoholic hydroxyl groups, and (B) a mixture of at least two molecular weights of at least one glycol and of at least one molecular weight of at least one dicarboxylic acid, wherein the amount of glycol is greater than the amount of dibasic acid by about one molecular weight, and wherein enough dibasic acid is non-olefinic so that at least 33 mol percent of the dibasic acid units in the said modified linear polyester resin are non-olefinic, the said esterifying in this latter instance being carried out until substantially all of the allylic ester, glycol and dibasic acid are mutually esterified.

References Cited in the file of this patent

UNITED STATES PATENTS

| | | |
|---|---|---|
| 2,280,242 | Kropa et al. | Apr. 21, 1942 |
| 2,478,015 | Rust et al. | Aug. 2, 1949 |
| 2,534,617 | Mohrman | Dec. 19, 1950 |